United States Patent
Sina et al.

(10) Patent No.: US 11,168,384 B2
(45) Date of Patent: Nov. 9, 2021

(54) PROCESS OF PREPARING A LITHIUM ALUMINUM ALLOY

(71) Applicant: FMC Lithium USA Corp., Philadelphia, PA (US)

(72) Inventors: Younes Sina, Charlotte, NC (US); William Arthur Greeter, Jr., Dallas, NC (US); Barry McGeorge, Charlotte, NC (US)

(73) Assignee: FMC Lithium USA Corp., Philadelphia, PA (US)

(*) Notice: Subject to any disclaimer, the term of this patent is extended or adjusted under 35 U.S.C. 154(b) by 0 days.

(21) Appl. No.: 16/933,312

(22) Filed: Jul. 20, 2020

(65) Prior Publication Data

US 2021/0025036 A1    Jan. 28, 2021

Related U.S. Application Data

(60) Provisional application No. 62/879,308, filed on Jul. 26, 2019.

(51) Int. Cl.
*C22C 24/00* (2006.01)
*C22C 1/03* (2006.01)

(52) U.S. Cl.
CPC ............... *C22C 24/00* (2013.01); *C22C 1/03* (2013.01)

(58) Field of Classification Search
CPC .................................. C22C 24/00; C22C 1/03
See application file for complete search history.

(56) References Cited

U.S. PATENT DOCUMENTS

| | | | |
|---|---|---|---|
| 3,957,532 A | 5/1976 | Settle et al. | |
| 4,632,899 A | 12/1986 | McManis et al. | |

FOREIGN PATENT DOCUMENTS

| | | |
|---|---|---|
| CN | 104060141 | 9/2014 |
| WO | 2014194709 | 12/2014 |

OTHER PUBLICATIONS

European Patent Office, International Search Report and Written Opinion of PCT/US2020/043019, dated Sep. 30, 2020.

*Primary Examiner* — Jessee R Roe
(74) *Attorney, Agent, or Firm* — F. Michael Sajovec; Williams Mullen

(57) ABSTRACT

A process for producing lithium aluminum ingots is provided. In one embodiment, the process includes preparing a master alloy comprising about 70 to 90 percent by weight lithium and 10 to 30 percent by weight aluminum and dissolving the master alloy in lithium at a temperature of from about 230° C. to 330° C. to provide a lithium aluminum ingot having between about 1500 to 2500 ppm by weight aluminum. In another embodiment, the process may produce a lithium aluminum ingot having about 0.001 to about 1.0 percent aluminum.

28 Claims, No Drawings

PROCESS OF PREPARING A LITHIUM ALUMINUM ALLOY

RELATED APPLICATION

The following application claims priority to U.S. Provisional Application No. 62/879,308, filed Jul. 26, 2019, the disclosure of which is incorporated herein in its entirety.

FIELD OF THE INVENTION

The present invention relates to a process for manufacturing a lithium aluminum alloy having improved consistency and increased homogeneity.

BACKGROUND OF THE INVENTION

Lithium aluminum alloys are useful in a variety of applications, including the production of airliner components and the formation of anodes in batteries. In particular, anodes made of lithium aluminum alloys provide batteries with high current and capacity densities and a long cycle life. Molds may be used to cast lithium aluminum alloys into various products, such as lithium aluminum ingots, for further processing.

However, current methods for producing lithium aluminum alloys and ingots suffer from several drawbacks. The melting point of aluminum (660° C.) is significantly higher than lithium (180° C.) and therefore dissolving aluminum in molten lithium requires high temperatures, as well as long agitation and settling times. High variability among produced ingots is another issue due to a lack of homogeneity in the alloys. In a reaction tank, aluminum metal tends to settle towards the bottom of the tank, as aluminum has a higher density than lithium. Thus, ingots produced using conventional lithium aluminum alloying techniques oftentimes have a lower than desired aluminum concentration towards the top of the tank. Similarly, ingots produced using conventional lithium aluminum alloying techniques near the bottom of the tank often have a higher aluminum concentration than intended. For example, a lithium aluminum alloy used for producing ingots having a desired aluminum concentration of about 2000 ppm will often yield ingots with about 8000 ppm from the bottom of the tank. Reaction tanks must also be cleaned on a frequent basis to remove accumulated aluminum metal at the bottom.

Individual ingots not complying with a desired specification must be melted and reprocessed, leading to increased production times and expense. The lack of homogeneity in the alloys becomes a greater issue when attempting to produce lithium aluminum ingots having a low aluminum value, since the small aluminum quantities may lead to greater variability (for example, 700% variance in aluminum concentration) among ingots and lower homogeneity within the ingots themselves. Poor homogeneity ingots may have regions with higher aluminum concentration that appear as blisters. These ingots may also have voids within having a lower aluminum concentrations than desired.

Thus, there is a need for improved processes for producing lithium aluminum ingots with reduced variability among individual ingots, and more particularly, a process for producing lithium aluminum ingots with low concentrations of aluminum.

SUMMARY OF THE INVENTION

To this end, the present invention provides a process for producing lithium aluminum ingots; particularly for the production of ingots with increased homogeneity. The process of preparing a lithium aluminum ingot comprises preparing a master alloy comprising about 70 to 90 percent by weight lithium and 10 to 30 percent by weight aluminum and dissolving the master alloy in lithium at a temperature of from about 230° C. to 360° C. to form the lithium aluminum ingot. In one embodiment, the lithium aluminum ingot comprises about 1500 to 2500 ppm by weight aluminum. In another embodiment, the lithium aluminum ingot comprises about 0.001% to 1.0% by weight aluminum. The process produces lithium metal alloys with improved homogeneity with reduced variability between lithium aluminum ingots; for example, the aluminum concentration of the ingots may vary by about 50% or less.

DETAILED DESCRIPTION OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

In accordance with the present invention, a process for producing lithium aluminum ingots is provided. The lithium aluminum ingots are produced from a uniform lithium aluminum alloy composition wherein the ingots formed from the alloy composition have less than 50% variation between the individual ingots. In some embodiments, the ingots formed from the alloy composition have about 20% variation or less between the individual ingots. For example, each lithium aluminum ingot produced from a uniform alloy composition may have about 1500 to 2500 ppm by weight of aluminum. In further embodiments, the ingots formed from the alloy composition may have about 5% variation or less between the individual ingots. The uniform lithium aluminum alloy composition is formed by dissolving a master alloy in molten lithium.

Lithium metal easily reacts with oxygen, nitrogen, humidity, hydrogen, carbon dioxide and other elements, which can lead to lithium losses to these side reactions, which occurs more readily while alloying lithium with higher melting point elements like aluminum due to operating the melting process at a higher temperature. The use of a master alloy as described herein minimizes lithium loss by lowering melting temperature of one of the constituents and reducing the time of exposure in the melting chamber, saving energy and production time.

Moreover, the master alloy also reduces the risk of segregation of the elements due to significant differences in densities. The homogeneity of the aluminum in the master alloy prevents aluminum from settling at the bottom of a reaction tank, reducing the frequency of tank clean-outs to remove sludge from the bottom of the tank. Moreover, the homogeneity prevents ingots formed from the alloy at the bottom of the tank from having an undesirably higher aluminum concentration and eliminates the need to recycle ingots with aluminum concentrations falling outside desired parameters.

In some embodiments, the master alloy is comprised of about 70 to 90 percent by weight lithium and about 10 to 30 percent by weight aluminum. A master alloy having an aluminum content of 30 percent by weight has a melting point about 330° C., which is a critical temperature, because above this temperature, significant lithium reaction occurs. In one embodiment, the master alloy is prepared by adding aluminum to molten lithium to produce a homogenous mixture without significant lithium reaction. The process for melting lithium may be conducted under a protective inert gas such as argon. The molten aluminum and lithium may be mixed by gradual addition of aluminum to molten lithium starting with lower temperatures. For example, the aluminum may be added to the molten lithium at a rate of about 1 g/min or higher. As the aluminum content increases, the temperature increases accordingly with respect to the Li—Al phase diagram. As the temperature approaches to about 30° C. above the liquidus temperature for the master alloy, the heating process may be stopped to prevent lithium evaporation.

In another embodiment, the aluminum and lithium may be separately melted then combined. The master alloy may also be made by the addition of lithium metal in either solid or liquid form to a molten aluminum pool. A temperature of 661° C. and above is required to maintain aluminum in its liquid state. Therefore, a fast lithium addition and controlled atmosphere is necessary to minimize the reaction and evaporation of lithium in molten aluminum.

The master alloy may have a melting temperature ranging between about 185° C. and about 330° C., depending on the percentage of aluminum present in the master alloy. In one embodiment, the melting temperature of the master alloy is between about 200° C. and about 300° C. For example, the master alloy may have a melting temperature between about 240° C. and about 260° C. The lower melting temperature of the master alloy, when compared to the melting temperature of pure aluminum (660° C.), improves the homogeneity of the aluminum in the product alloy by allowing better dispersion of the aluminum throughout the molten lithium during agitation, thereby enabling the production of lithium aluminum ingots having a uniform or substantially improved homogeneity of alloy composition.

Once the master alloy is prepared, it is added to lithium at a temperature of about 230° C. to about 330° C. The lithium and molten alloy may be mixed to form a homogenous mixture. The master alloy and lithium may be heated for a duration between about 30 minutes and about 8 hours. Exotic materials such as Nb, Ta, W, and Mo, as well as cheaper materials like low carbon stainless steel, may be used as proper material of construction for crucible in the lithium aluminum alloying process. In one embodiment, the master alloy and lithium are then cooled at a rate between about 1° C./min and 100° C./min, depending on the desired grain size, to form a uniform alloy composition. In some embodiments, the master alloy and lithium may settle after heating within about four to five hours. In contrast, dissolving aluminum in molten lithium without a master alloy requires settling times up to about seven to nine hours. Thus, the use of a master alloy to form the lithium alloy composition decreases the amount of time needed for the mixture to settle by about one-third.

After the alloy composition has been formed from the master alloy and molten lithium, it can be cast in molds having a desired form factor. Casting/solidification can be implemented in vertical or horizontal/continuous casting systems. The solidification rate may be determined based upon the size of ingots and other mechanical properties. Ingots formed from the uniform or substantially uniform alloy composition have a variability rate of 50% or less among ingots.

The following examples are merely illustrative of the invention and are not limiting thereon.

EXAMPLES

Example 1: Preparation of 80% Lithium/20% Aluminum Master Alloy 4 kg of lithium metal is melted in a tantalum-lined crucible and heated to slightly above its melting point, e.g. 200° C. The melting process is under a protective inert gas such as argon to prevent any unwanted reactions. 1 kg of aluminum metal is added in small pieces to the melt. The process temperature is gradually increased until all the added aluminum metal dissolves in molten lithium. When the temperature of alloying reaches about 30° C. above the melting temperature for the master alloy (e.g. 275° C.), the heating process is stopped to prevent lithium evaporation. The master alloy is then agitated to produce a more homogenous alloy. The master alloy is then rapidly solidified, sealed and kept in a dry room for further use. The master alloy has a final weight of 5 kg and a final composition of 80% lithium and 20% aluminum.

Example 2: Formation of Lithium Aluminum Alloy

The master alloy in Example 1 is added to molten lithium in a closed, agitated vessel to form a lithium aluminum alloy with an aluminum concentration less than 1%. The vessel temperature is kept low and constant at slightly above the melting point of lithium, e.g. 182-200° C.

Example 3: Preparation of 70% Lithium/30% Aluminum Master Alloy 3.5 kg of lithium metal is melted in a tantalum crucible and heated to slightly above its melting point, e.g. 200° C. The melting process is conducted under argon as a protective inert gas to prevent any unwanted reactions. 1.5 kg of aluminum metal is added to the melt. The process temperature is gradually increased until all the added aluminum metal dissolves in molten lithium. When the temperature of alloying reaches to about 30° C. above the liquidus temperature for the master alloy (e.g., 360° C.), the heating process is stopped to prevent any unfavorable lithium reaction. The master alloy is then agitated to produce a more homogenous alloy. The master alloy is then rapidly solidified, sealed and kept in a dry room for further use. The alloying and solidification steps are also conducted under argon. The master alloy has a final weight of 5 kg and a final composition of 70% lithium and 30% aluminum.

Aluminum Concentrations for Lithium Aluminum Ingots Produced Using Master Alloy

Tables 1 and 2 provide an overview of aluminum content among the plurality of lithium aluminum ingots produced from a lithium aluminum alloy composition formed from using a 70% lithium/30% aluminum master alloy. The aluminum concentration for the first, tenth and last ingots are provided for each production run.

TABLE 1

Aluminum Content for Production A of Lithium Aluminum Ingots

| Ingot | Aluminum Content (ppm) |
| --- | --- |
| First | 1977 |
| 10$^{th}$ | 2027 |
| Last | 2038 |

TABLE 2

Aluminum Content for Production B of Lithium Aluminum Ingots

| Ingot | Aluminum Content (ppm) |
| --- | --- |
| First | 2008 |
| 10$^{th}$ | 2055 |
| Last | 1893 |

Lithium aluminum ingots traditionally have greater than 700% variance between individual ingots during a production run. As shown in Tables 1 and 2, production of lithium aluminum ingots using the master alloys described herein results in significantly lower variance among the ingots produced. The ingots of Table 1 have a variance of about 2% with an aluminum content of about 2000±40 ppm. The ingots of Table 2 have a variance of about 2.7% with an aluminum content of about 2000±55 ppm.

TABLE 3

Aluminum Content for Production C of Lithium Aluminum Ingots

| Ingot (out of 13 total) | Aluminum Content (ppm) |
| --- | --- |
| 11 | 1967 |
| 12 | 1978 |
| 13 | 1998 |

Table 3 provides aluminum concentrations for lithium aluminum ingots produced using the lithium alloy composition remaining near the bottom of a reaction tank. The lithium aluminum ingots in Production C had a desired aluminum content of about 2000 ppm. As shown in Table 3, the lithium aluminum ingots retained the desired aluminum content despite using the alloy composition near the bottom of the tank. These results demonstrate the homogeneity of the lithium aluminum alloy composition and the low variability of lithium aluminum ingots produced from the alloy composition. Thus, lithium aluminum ingots produced from the alloy composition have a uniform aluminum concentration among all individual ingots throughout production.

Although the present approach has been illustrated and described herein with reference to preferred embodiments and specific examples thereof, it will be clear to those of ordinary skill in the art that other embodiments and examples may perform similar functions and/or achieve like results. All such equivalent embodiments and examples are within the spirit and scope of the present approach.

That which is claimed is:
1. A process of preparing a plurality of lithium aluminum ingots comprising:
    (a) preparing a master alloy comprising about 70 to 90 percent by weight lithium and 10 to 30 percent by weight aluminum and
    (b) dissolving the master alloy of step (a) in lithium at a temperature of from about 230° C. to 360° C. to provide a uniform alloy composition,
    (c) producing a plurality of lithium aluminum ingots from the uniform alloy composition wherein each lithium aluminum ingot has between about 1500 to 2500 ppm by weight aluminum.
2. The process of claim 1, wherein preparing the master alloy comprises melting the aluminum and adding lithium.
3. The process of claim 2 further comprising mixing the lithium and the aluminum to produce a homogenous mixture.
4. The process of claim 1, wherein the master alloy of step (a) has a melting point temperature between about 185° C. and about 330° C.
5. The process of claim 4, wherein the master alloy of step (a) has a melting point temperature between about 200° C. and about 300° C.
6. The process of claim 5, wherein the master alloy of step (a) has a melting point temperature between about 240° C. and about 260° C.
7. The process of claim 1, wherein the lithium aluminum ingot of step (c) is homogenous.
8. The process of claim 7, wherein dissolving the master alloy of step (a) in lithium further comprises cooling the master alloy and lithium at a rate selected to form the uniform alloy composition.
9. The process of claim 8, wherein the master alloy and lithium are cooled at a rate between about 1° C./min and 100° C./min.

10. The process of claim 7 further comprising agitating the master alloy of step (a) in lithium to form a uniform alloy composition.

11. The process of claim 1, wherein dissolving the master alloy of step (a) in lithium comprises heating the master alloy in lithium at the temperature of from about 230° C. to 330° C. for a duration between about 0.5 hours and about 8 hours.

12. The process of claim 1, wherein dissolving the master alloy in lithium comprises adding the master alloy to the lithium at a rate of at least about 1 g/min.

13. The process of claim 1, wherein each lithium aluminum ingot from the plurality of lithium aluminum ingots has between about 1900 to 2100 ppm by weight aluminum.

14. The process of claim 13, wherein each lithium aluminum ingot from the plurality of lithium aluminum ingots has between about 1950 to 2050 ppm by weight aluminum.

15. The process of claim 1, wherein the plurality of lithium aluminum ingots has a variance in aluminum content of about 20 percent or less between each lithium aluminum ingot.

16. The process of claim 15, wherein the plurality of lithium aluminum ingots has a variance in aluminum content of about 5 percent or less between each lithium aluminum ingot.

17. A process of preparing a lithium aluminum ingot having an aluminum content by weight of about 0.001 to 1.0 percent:
   (a) preparing a master alloy comprising about 70 to 90 percent by weight lithium and 10 to 30 percent by weight aluminum and
   (b) dissolving the master alloy of step (a) in lithium at a temperature of from about 230° C. to 330° C. to provide a lithium aluminum ingot having about 0.001 to about 1.0 percent aluminum.

18. The process of claim 17, wherein preparing the master alloy comprises melting the aluminum and adding lithium.

19. The process of claim 18 further comprising mixing the lithium and the aluminum to produce a homogenous mixture.

20. The process of claim 17, wherein the master alloy of step (a) has a melting point temperature between about 185° C. and about 330° C.

21. The process of claim 20, wherein the master alloy of step (a) has a melting point temperature between about 200° C. and about 300° C.

22. The process of claim 21, wherein the master alloy of step (a) has a melting point temperature between about 240° C. and about 260° C.

23. The process of claim 17, wherein the lithium aluminum ingot of step (b) has a uniform composition.

24. The process of claim 23, wherein dissolving the master alloy of step (a) in lithium further comprises cooling the master alloy and lithium at a rate selected to form the uniform alloy composition.

25. The process of claim 24, wherein the master alloy and lithium are cooled at a rate between about 1° C./min and 100° C./min.

26. The process of claim 23 further comprising agitating the master alloy of step (a) in lithium to form the uniform alloy composition.

27. The process of claim 17, wherein dissolving the master alloy of step (a) in lithium comprises heating the master alloy in lithium at the temperature of from about 230° C. to 330° C. for a duration between about 0.5 hours and about 8 hours.

28. The process of claim 17, wherein dissolving the master alloy in lithium comprises adding the master alloy to the lithium at a rate of at least about 1 g/min.

* * * * *